INVENTOR.
LUKE M. HARVEY

BY James R. Campbell

ATTORNEY

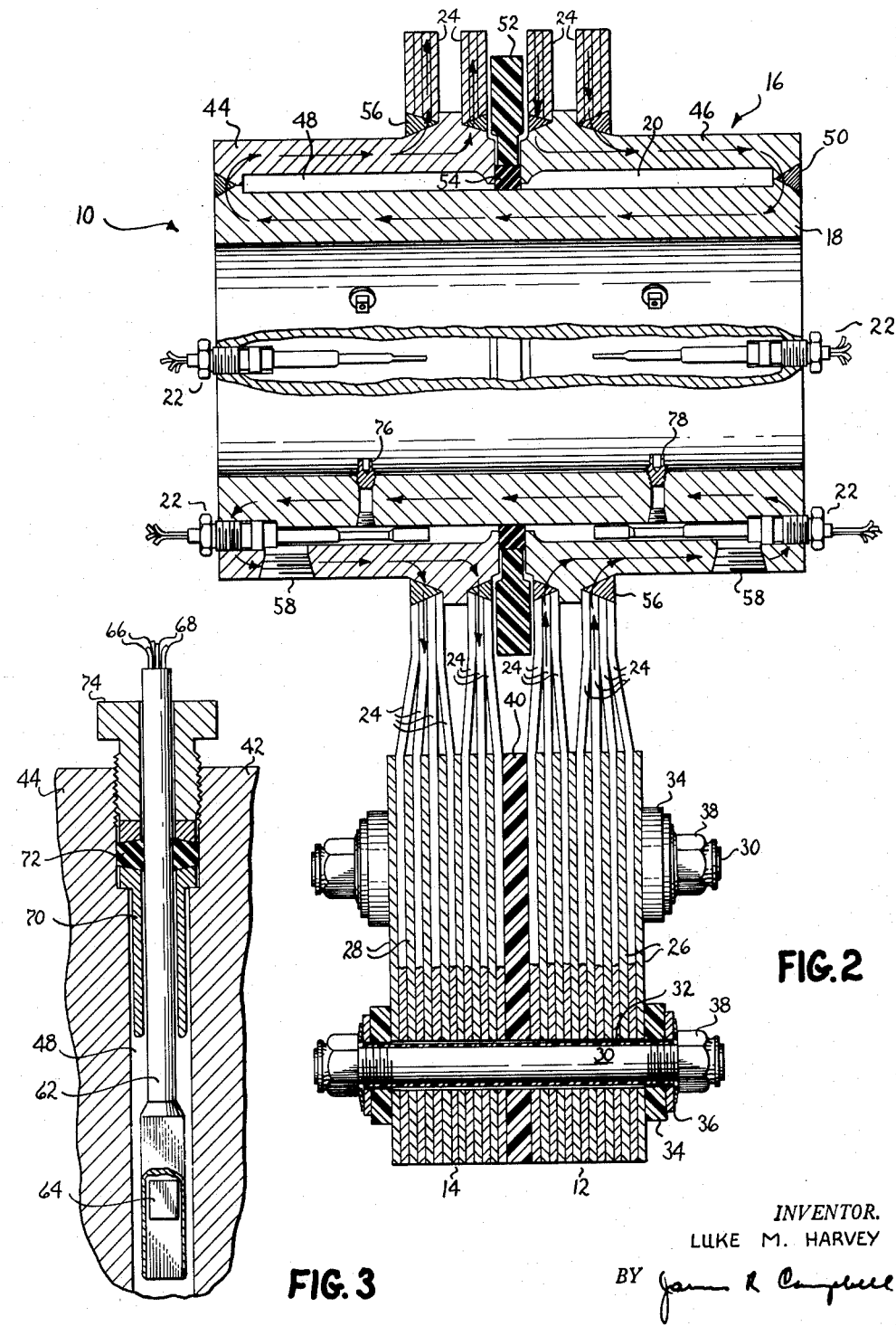

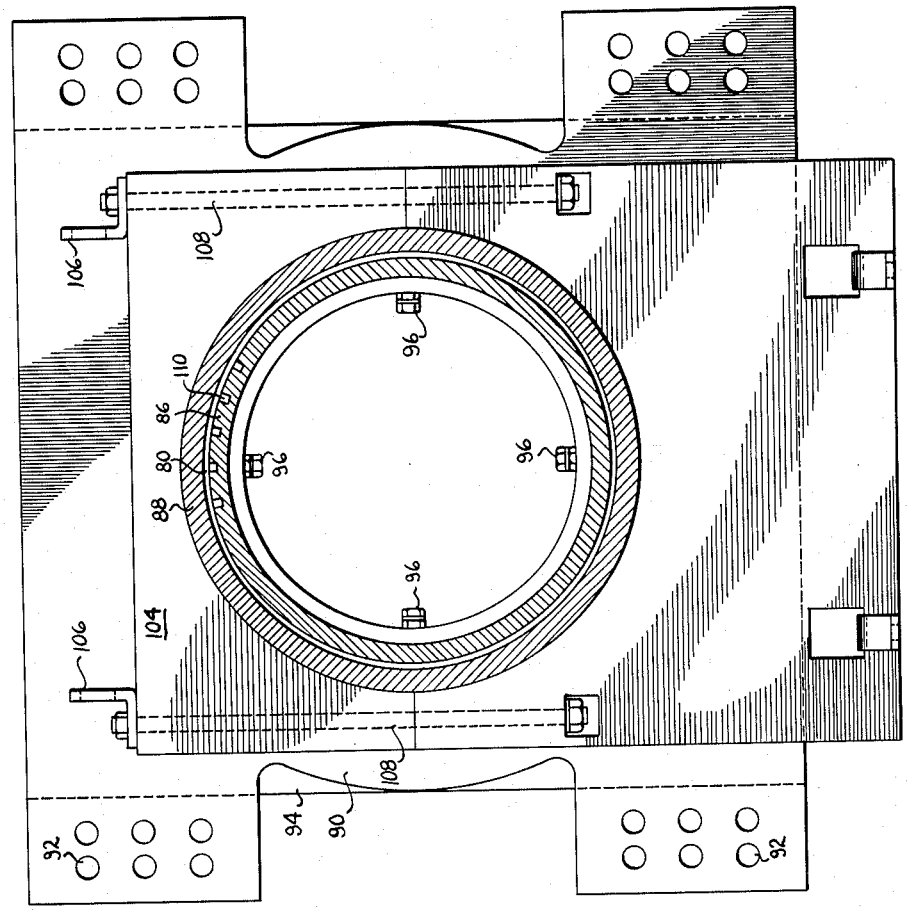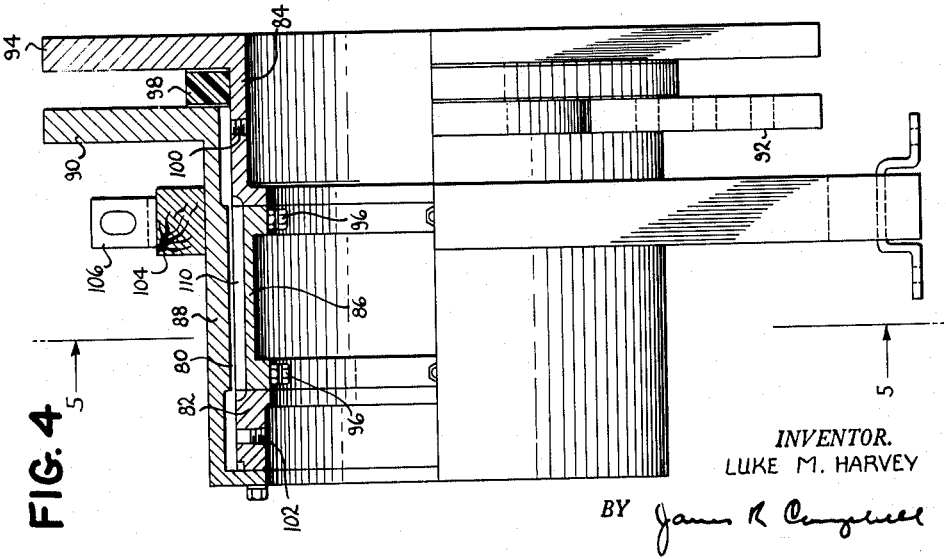

United States Patent Office 3,260,939
Patented July 12, 1966

3,260,939
CYLINDRICAL INSTRUMENT SHUNT FOR LARGE MAGNITUDE CURRENTS
Luke M. Harvey, Schenectady, N.Y., assignor to General Electric Company, a corporation of New York
Filed Jan. 2, 1962, Ser. No. 163,831
11 Claims. (Cl. 324—126)

The invention described herein relates to electrical instruments and particularly to a current measuring shunt useful in measuring bus bar currents in magnitudes greater than several thousand amperes.

The need for measuring currents in excess of that capable of being handled by conventional ammeters has given rise to the development of current measuring shunts which determine the current values by measuring the voltage drop across a known resistance, or by measuring the flux density surrounding a current carrying conductor. In the first type, the current being measured must flow through the shunt, and it is difficult to maintain its resistance constant because of the heat generated in the measuring device. This placed a limitation on the accuracy and to my knowledge, known current measuring shunts cannot with precision, measure currents in excess of about 10,000 amperes.

The devices now used for this purpose, utilize massive copper plates interconnected by spaced strips of manganin welded to the copper end pieces. It is necessary to maintain the temperature constant and the device therefore is cooled by air, but since variation in current flow produces different levels of heating, a uniform flow of air thereover cannot maintain a constant temperature.

Since the resistance of the copper end pieces varies about 0.4% per degree centigrade and since the resistance of the welded joints and copper is an appreciable percentage of the total resistance, the accuracy of the device is limited to about 1%.

Moreover, known current measuring shunts are not compensated, that is, the device is not protected against the influence of stray magnetic fields. In those cases where the current is estimated by measuring the voltage drop across at least a portion of the shunt, it will be apparent that the voltage developed will not be a true indication of the current because of the effect the induced voltage will have on the reading. Such stray magnetic fields also distorts the current distribution in the shunt so that it may be greater in one part than in another. Regardless of where the sensing or voltage measuring elements are positioned in the shunt, they will not be capable of sensing an average flow of current under all conditions of operation.

Devices used for the second type of measurement consist of a plurality of L-shaped magnetic yoke sections assembled to form a square surrounding the bus bar but spaced from each other at their ends to form air gaps therebetween. The sensing elements located within the gaps respond to the flux flow thereacross and thereby provide a reading of the current flowing in the bus bar assembly. The primary disadvantage of this kind of construction is the iron of the yoke must be operated at a flux density less than that which will cause saturation of the iron. In the event a large number of ampere turns are involved, such as 500,000, in order to prevent the iron from saturating, it is necessary to provide large air gaps which result in inaccuracy in the readings taken.

The above cited disadvantages indicate the need for an improved current measuring shunt capable of both eliminating the problems connected with known devices and extending the range to measure currents of high magnitude.

The primary object of my invention therefore is to provide a relatively small device capable of measuring current values up to about one million amperes and within an accuracy range of about 1%. For currents up to about 50,000 amperes, a precision of 0.001% is obtainable.

Another object of my invention is to provide a current measuring shunt employing a metal of high conductivity, such as copper, but still capable of operation independent of the temperature of the copper.

In carrying out my invention in its preferred form, I measure the current flowing through a shunt adapted for connection to bus bars by sensing the magnitude of flux density in an air gap surrounding the current carrying member. Accurate readings are obtainable since the shunt is compensated by enclosing its outer peripheral surfaces in a protective member which prevents stray magnetic fields from influencing the density of flux being detected by the sensing elements. The protective member serves the further function of coacting with the shunt to form an air gap through which a liquid is circulated for cooling the device and maintaining it at a constant predetermined temperature.

While the specification concludes with claims particularly pointing out and distinctly claiming the subject matter which I regard as my invention, it is believed the invention will be better understood from the following description taken in connection with the accompanying drawing in which:

FIGURE 2 is a view in elevation, partly in section, taken on lines 2—2 of FIGURE 1 and illustrating in detail, the various components comprising the current measuring shunt;

FIGURE 3 is a cross sectional view in elevation of a sensing element adapted for use with the shunt of FIGURES 1 and 2;

FIGURE 4 is a cross sectional view in elevation of a modification of the current measuring shunt; and FIGURE 5 is a view taken on lines 5—5 of FIGURE 4.

Figure 1:
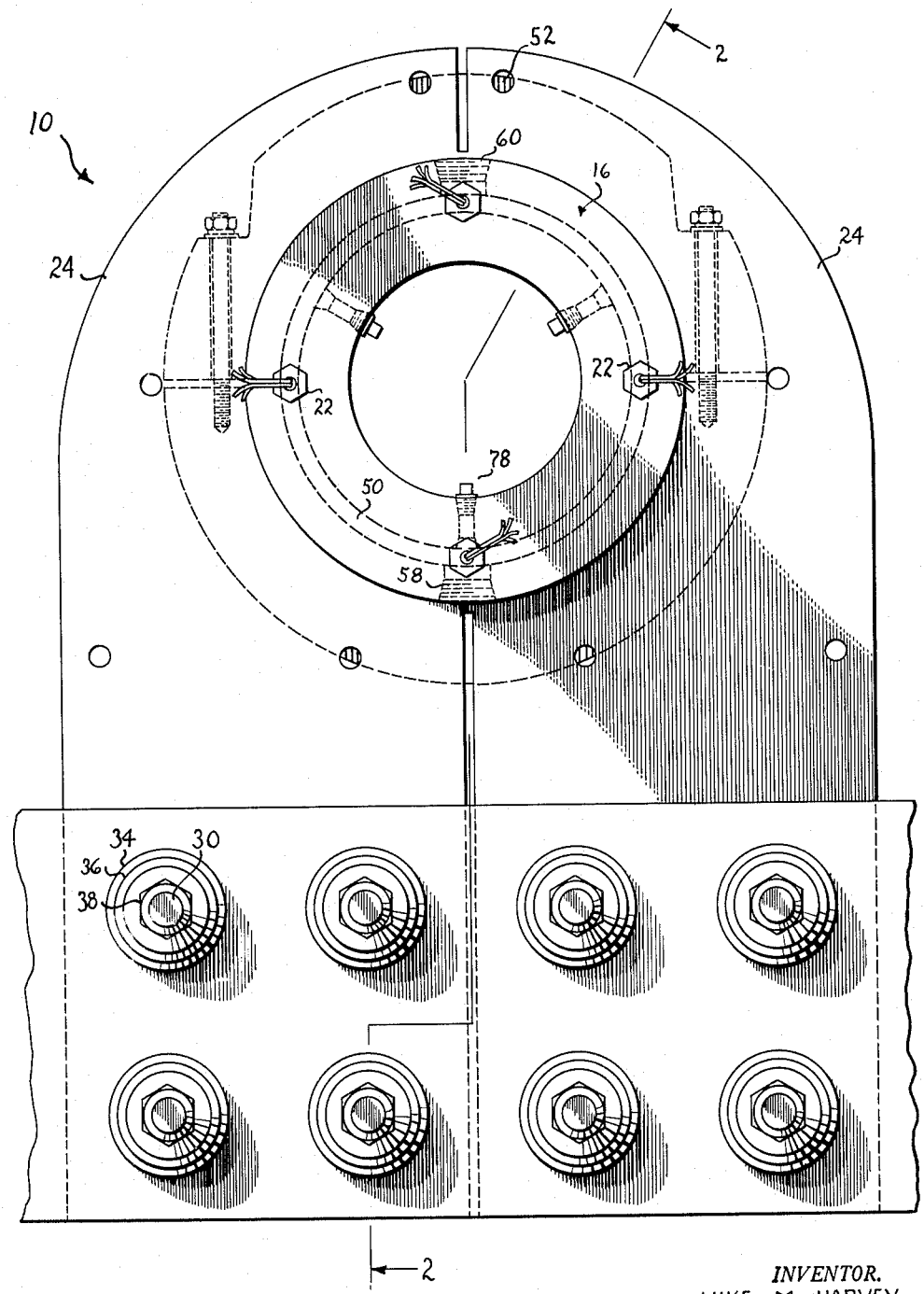
FIGURE 1 is an end view in elevation of a current measuring shunt illustrating the disposition of sensing elements used for determining the value of current flowing therethrough.

Referring now to the drawings wherein like reference characters designate like or corresponding parts throughout the several views, there is shown in FIGURES 1–3, a current measuring shunt 10 comprising positive and negative terminals 12 and 14 shaped to provide nearly uniform current density in a pair of concentric cylinders 16 and 18 spaced from each other radially to form an air gap 20 therebetween. Sensing elements 22 are positioned in the air gap for sensing the flux density of the magnetic field established by current flowing from one terminal 12 through the outer and inner concentric cylinders prior to returning to the negative terminal 14.

Considering now the various components comprising the shunt 10, each of the positive and negative terminals 12 and 14 comprise a multitude of copper laminations 24 adapted for connection at their lower end to bus bars 26 and 28 which carry the current to be measured by the shunt. The laminations are held in firm engagement therewith by means of through bolts 30 electrically isolated from the walls forming the bolt opening in the laminations 24 and the bus bars 26 and 28, by an insulating spacer 32. Insulators 34 and washers 36 separate the laminations from nuts 38 used in firmly tieing the parts together. In order to electrically isolate the terminals 12 and 14 from each other, an insulator 40 of Textolite or other insulating material is located between the facing surfaces of the laminations comprising the positive and negative terminals.

The upper end of the laminations 24 are shaped to the configuration shown in FIGURE 1, and encircle the current measuring shunt 10 in the manner illustrated in the drawing.

The device comprises two cylinders 16 and 18 concentrically positioned in spaced relation to provide an air gap 20. Cylinder 16 may consist of two separate cylinders 44 and 46. As shown in FIGURE 2, the opposite ends of the cylinders 44 and 46 are welded at 50 to provide a closed path for the flow of current through the device.

The outer rings or cylinders 44 and 46 which are spaced from both the inner cylinder 18 and from each other along their axial length, are mechanically joined by an insulating ring 52 and a rubber seal ring 54 having one surface in contact with the peripheral surface of the inner cylinder 18 to divide the air gap into two parts 48 and 20. As shown, the curved surfaces of the laminations 24 of each terminal 12 and 14 which encircle the outer cylinders 44 and 46 are welded to the outer peripheral surfaces thereof, as indicated at 56.

It will be apparent that in lieu of having the outer cylinder comprise two axially spaced rings or cylinders, a single outer cylinder could be used with terminals 12 and 14 being attached respectively to the cylinder ends.

When the bus bars 26 and 28 carry current, current flows upwardly through the laminations 24 from the positive terminal 12 axially outward through cylinder 46 as indicated by the arrows, and then axially along the inner cylinder 42 prior to returning to the negative terminal 14. Current flow establishes a magnetic field in the air gap and a measurement of the flux density thereof is used for determining the amount of current flowing between the terminals.

In order to obtain such measurement, a plurality of devices sensitive to the flux of the magnetic field are located in the air gap at 90° intervals around the shunt. These sensing devices are adapted for connection to recording instruments not shown for determining the value of current flowing through the circuit. Although four sensing devices are located on each side of the shunt, it will be apparent that a singular device may be used, but in the preferred form disclosed herein, a multitude of such devices are utilized since their joint sensing action permits the measurement of the average flux density in the air gap, thus providing an accurate reading of the current flowing in the circuit.

The flux therefore is established in the air gap by current flow in the inner cylindrical conductor while current in the outer conductor cylinders confines the flux to the air gap between the inner and outer cylinders, and thereby serves to shield the device from nearby magnetic material. The outer cylinders also serve to reduce the inductance of the device to a very small predetermined value so the shunt can be used to measure accurately currents which are changing rapidly with time.

The flux in the gap can be calculated by the formula $$B=\frac{4I}{D}$$

where $B$=flux density in gausses
$I$=current in amperes
$D$=mean gap diameter in millimeters The shunt can be designed for any current, the only requirement being that the diameter of the inner conductor be large enough to limit the flux density in the gap to about 10,000 gausses at maximum current. However, because of thermal limitations, it is not desirable to operate continuously with a gap density of more than 3000 to 4000 gausses.

Temperature control is obtained by circulating a liquid coolant in the air gap space. Such coolant is introduced in inlets 58 preferably located in the bottom of the device, with the outlets 60 being formed in the upper end thereof, so that coolant flows upwardly and circumferentially between the spaced cylinders and out the outlets at the top. Conventional thermostatic cooling elements may be used in an external cooling circuit, not shown, including a heat exchanger, for maintaining the temperature of the coolant at predetermined levels.

The sensing elements 22 used for measuring the flux density in the gap are semiconductor devices which produce an output voltage proportional to the product of an exciting current and the flux density passing through it. As illustrated in FIGURE 3, the device consists of a metallic probe 62 having an active element of indium antimonide in the form of a small thin wafer 64. The unit is equipped with terminals located at opposite ends thereof, not shown, and the exciting current is supplied thereto through leads 66. Output leads 68 connected midway between the wafer ends, not shown, provides a voltage proportional to the product of the magnetic field being measured and the current passing through the element. This unit which is located in the air gap 48 is held therein by a spacer 70 and an insulating washer 72, all held in place by a locking sleeve 74.

The sensing device operates on the principle that when a conducting material is placed in a magnetic field perpendicular to the direction of current flow, a voltage is developed across the material in a direction perpendicular to both the magnetic field and the current. The voltage results from the deflection of electrons toward the sides of a conducting element by the applied magnetic field, and are picked up by the terminals 68. The voltage therefore is proportional to the product of the magnetic field and the exciting current passing through the wafer 64. With a constant current input, the voltage output is proportional to the magnetic field intensity and a voltmeter conveniently is used for measurement of the output voltage which is directly indicative of the magnetic field intensity. The proportionality factor depends upon the particular geometrical configuration as well as the material properties. The particular sensing device chosen for use with this invention is commercially available and is known as a Halltron device, manufactured by the Ohio Semiconductors Company of Columbus, Ohio.

If the exciting current for this sensing device is supplied from the terminals of the machine producing the current being measured, and in such manner that the exciting current is proportional to the terminal voltage, the output voltage of the sensing device will be proportional to the power output of the machine. Therefore, by using two or more sensing devices, the shunt can serve as both a current measuring device and a wattmeter, the latter being particularly useful in determining the power output of the machine.

An auxiliary method for determining current flow through the shunt is by measuring the voltage drop across a measured length of the inner cylindrical conductor with a standard millivolt meter. The accuracy of this measurement is limited to the accuracy of the determination of the resistance and temperature of the measured section. In the embodiment disclosed herein, the millivolt meter may be connected across probes 76 and 78 positioned in the inner surface of the inner conductor 42.

Although the above described current measuring shunt is of particular utility in measuring current values from about 50,000 amperes up to and above 1,000,000 amperes, it will be apparent that it can be used below this range if desired.

In a modification, a current measuring shunt of the type capable of measuring current values accurately between 10,000 and 40,000 amperes is shown in FIGURES 4 and 5. As illustrated therein, the current measuring shunt comprises a pair of concentrically disposed cylinders with an air gap 80 positioned therebetween. The inner cylinder consists of a pair of copper rings 82 and 84 having disposed therebetween a cylindrical member 86 of manganin, which is an alloy of manganese, copper and nickel. The outer cylinder 88 positioned in concentric relation thereto likewise is made of copper and is equipped with a terminal 90 extending outwardly from both ends of the shunt and equipped with bored openings 92 which permit attachment to bus bars carrying the current adapted to be measured. As in the previous embodiment, it serves as a compensating device. The copper section 84 of the inner concentric cylinder likewise terminates in a terminal 94 adapted for connection to bus bars. Probes 96 embedded in the inner peripheral surface of the manganin cylinder, and spaced an exact distance apart, are designed to accept the leads of a millivolt meter for measuring the voltage drop across the measured section of manganin. In order to electrically isolate the two adjacent terminals 90 and 94, a ring of insulating material 98 of Textolite or other insulation product is positioned therebetween as shown in FIGURE 4. The ring also serves to close the air gap.

Since it is highly desirable to operate the current measuring shunt within a very small temperature range in order to take advantage of the resistivity characteristics of the manganin, a coolant such as oil is introduced through inlets 100 and caused to flow axially in the air gap space prior to being discharged through the outlets 102. In many cases, it is desirable to have as large a surface area of the manganin as possible available for contact by the coolant for maintaining the latter at a predetermined temperature. This is accomplished by providing a plurality of radial saw cuts 110 in the manganin surface, and which are circumferentially spaced around the outer peripheral surface of the manganin ring 86. Obviously, grooves or other indentations may be formed in the surface of the manganin facing the air gap for accomplishing the same result. As stated previously, the external circuit for automatically maintaining the circulating oil at a predetermined temperature may be of a conventional and well known design.

To provide support for the current measuring shunt, a plywood block 104 is positioned around the outer cylinder 88 and is equipped with lifting lugs 106. Since the current measuring shunt is of a circular configuration as shown, the plywood blocks are split at their center and bolts 108 are used for securing the two split halves together. Since this support is adapted to merely hold the shunt in a convenient position, it will be apparent that any other designs may just as conveniently be used provided it does not conflict with the electrical characteristics of the device.

The operation of the current measuring shunt in this modification is the same as that previously described in that current flows through the positive terminal 90 and axially along the outer cylinder 88 and returns in an opposite direction through the inner cylinder 86 prior to return to the negative terminal 94. The temperature of oil circulated through the air gap maintains the measured section of manganin at a predetermined temperature level and since both its length and resistance is accurately known, it is possible to measure the voltage drop thereacross which will be an indication of current flow through the device. A millivolt meter connected to the studs 96 will give an accurate indication of the voltage difference across the measured section of manganin.

In view of the above, it will be apparent that many modifications and variations are possible in light of the above teachings. For example, the probes 76 and 78 could be attached to the outer cylinder rather than the inner, and extend either into the air gap or be located on the outer peripheral surface of the outer cylinder. The sensing elements 22 could be positioned in one end of the shunt, with the terminals 12 and 14 being attached to the other end. The inner cylinder may be divided into two axially spaced rings or cylinders, mechanically joined by an insulator, and with the terminals respectively attached to the two rings. This construction would be very similar to the outer cylinders now shown in FIGURE 2, except that the inner and outer cylinders of FIGURE 2 would be reversed. However, to measure the flux density, the sensing elements 22 would be positioned between the surface of a terminal and the facing surfaces of the two rings constituting the inner cylinder.

Also, instead of using the solid continuous inner cylinder of FIGURE 3, the cylinder could comprise a pair of spaced copper end rings interconnected by a multitude of circumferentially spaced but horizontally extending strips of manganin. Coolant then would be introduced into the air gap at one end of the device and flow radially inward to a collector which preferably discharges the coolant at the other end. It would be desirable to maintain the coolant under pressure so that uniform flow between the manganin strips would occur. It therefore is to be understood that within the scope of the appended claims, the invention will be practiced other than as specifically described.

What I claim as new and desire to secure by United States Letters Patent is:

1. A current measuring shunt comprising inner and outer cylinders positioned in radially spaced concentric relation to each other and forming an air gap therebetween, said cylinders each having first and second ends in respective axial alignment, said inner cylinder being fabricated of electrically conductive material, said outer cylinder comprising a pair of electrically conductive rings separated along their axial length by an insulator, means respectively electrically conductively joining said first ends and said second ends, a terminal connected to each of said rings thereby forming a closed current conductive path from the terminals through said rings and said inner cylinder so that when current flows therethrough, a magnetic field is established in the air gap, and a multitude of sensing devices positioned in the air gap and spaced at predetermined intervals therearound for measuring the flux density of the magnetic field in the air gap, said measurement being a true indication of the current flowing in said cylinders.

2. The combination according to claim 1 wherein fluid inlet and outlet connections are respectively made in said rings for permitting the circulation of a coolant through the air gap for maintaining the temperature and resistance of the shunt at a predetermined level.

3. The combination according to claim 1 wherein auxiliary measuring means are positioned in one of said cylinders for measuring the value of current flowing therethrough, said auxiliary means comprising a pair of probes in direct contact with the said one cylinder and located a predetermined axial distance apart, said distance being sufficiently great to have a voltage drop between said probes when current flows between said terminals.

4. The combination according to claim 1 wherein means are located in the air gap for restricting the flow of coolant in a circumferential direction to the two axial sides of the air gap.

5. A current measuring shunt comprising: a pair of radially spaced electrically conductive concentric cylinders providing a gap therebetween and having at least one pair of respective ends in axial alignment; means electrically conductively joining said ends; positive and negative terminals respectively connected electrically to each of said cylinders; a pair of electrically conductive studs mounted in at least one of said cylinders and located at a predetermined axial distance from each other, said studs having means on the exposed ends thereof adapted to receive the leads of a meter used for measuring the voltage drop across said predetermined distance thereby to indicate the magnitude of current flowing through said shunt.

6. The shunt of claim 5 having a coolant inlet and a coolant outlet communicating with said gap.

7. A current measuring shunt comprising: a pair of radially spaced electrically conductive concentric cylinders providing a gap therebetween and having at least one pair of respective ends in axial alignment; means electrically conductively joining said ends; positive and negative terminals respectively connected electrically to each of said cylinders; and magnetic field sensing means located in said gap and providing an indication of the magnitude of current flowing through the shunt.

8. The shunt of claim 7 having a coolant inlet and a coolant outlet communicating with said gap.

9. A current measuring shunt comprising: inner and outer radially spaced cylinders positioned in concentric relationship with each other and defining a gap therebetween, said outer cylinder comprising a pair of axially spaced electrically conductive members joined together by a ring of insulating material, said inner cylinder being fabricated of electrically conductive material, said cylinders each having first and second ends, said first ends and said second ends being respectively axially aligned and respectively electrically conductively connected together, two laminated leads extending from corresponding terminals and positioned in concentric relationship to the outer of said cylinders and electrically conductively attached to said members, respectively, and magnetic field sensing means in said gap for indicating the magnitude of current flow between said terminals.

10. A current measuring shunt comprising: a pair of radially spaced electrically conductive concentric cylinders providing a gap therebetween and having at least one pair of respective corresponding ends in axial alignment, one of said cylinders comprising a pair of axially spaced conductive rings having a section of manganin positioned axially therebetween, means electrically conductively joining said corresponding ends, means electrically connecting the ends of said cylinders opposite said corresponding ends to respective power input terminals, and voltage probes disposed in axial spaced relationship in said section of manganin to provide a sensed voltage indicative of a magnitude of current flowing between said power terminals.

11. The shunt of claim 10 having coolant inlet and outlet means communicating from outside said shunt to said gap and a grooved heat exchange surface in the section of manganin adapted to be contacted by the coolant.

References Cited by the Examiner
UNITED STATES PATENTS

| | | | |
|---|---|---|---|
| 1,084,721 | 1/1914 | Willis | 324—126 |
| 2,760,157 | 8/1956 | Dexter | 324—126 |

WALTER L. CARLSON, *Primary Examiner.*

R. V. ROLINEC, *Assistant Examiner.*